(12) United States Patent
Wang et al.

(10) Patent No.: US 8,840,791 B2
(45) Date of Patent: Sep. 23, 2014

(54) MULTILAYER MICROFILTRATION MEMBRANE

(75) Inventors: I-Fan Wang, San Diego, CA (US);
Richard Morris, Longwood, FL (US);
Xuemei Liang, Pensacola, FL (US)

(73) Assignee: Pall Corporation, Port Washington, NY (US)

( * ) Notice: Subject to any disclaimer, the term of this patent is extended or adjusted under 35 U.S.C. 154(b) by 0 days.

(21) Appl. No.: 13/224,002

(22) Filed: Sep. 1, 2011

(65) Prior Publication Data
US 2013/0056420 A1 Mar. 7, 2013

(51) Int. Cl.
| | | |
|---|---|---|
| *B01D 61/00* | (2006.01) | |
| *B01D 39/14* | (2006.01) | |
| *B01D 39/00* | (2006.01) | |
| *B01D 67/00* | (2006.01) | |
| *B01D 69/02* | (2006.01) | |
| *B01D 69/06* | (2006.01) | |
| *B01D 69/12* | (2006.01) | |
| *B01D 71/68* | (2006.01) | |
| *B01D 61/14* | (2006.01) | |

(52) U.S. Cl.
CPC ...... *B01D 67/0013* (2013.01); *B01D 2325/023* (2013.01); *B01D 69/02* (2013.01); *B01D 2325/022* (2013.01); *B01D 2325/02* (2013.01); *B01D 69/06* (2013.01); *B01D 61/147* (2013.01); *B01D 69/12* (2013.01); *B01D 67/0016* (2013.01); *B01D 71/68* (2013.01)
USPC . 210/650; 210/500.27; 210/490; 210/500.22; 210/500.41; 210/493.1; 264/41; 264/173.12; 427/422

(58) Field of Classification Search
CPC ........ B01D 69/02; B01D 69/12; B01D 71/68; B01D 69/06; B01D 61/147; B01D 2325/02; B01D 2325/0232
USPC ............ 210/500.27, 500.38, 500.36, 500.41, 210/500.42, 490, 500.22, 493.1, 650; 264/41; 428/315.9; 427/244–245
See application file for complete search history.

(56) References Cited

U.S. PATENT DOCUMENTS

| | | | |
|---|---|---|---|
| 4,340,479 A | 7/1982 | Pall | |
| 4,340,480 A | 7/1982 | Pall et al. | |
| 4,933,081 A | 6/1990 | Sasaki et al. | |
| 5,228,994 A | 7/1993 | Tkacik et al. | |
| 5,620,790 A * | 4/1997 | Holzki et al. | 428/315.9 |
| 5,846,422 A | 12/1998 | Ditter et al. | |
| 5,906,742 A | 5/1999 | Wang et al. | |
| 6,056,529 A * | 5/2000 | Meyering et al. | 425/143 |
| 6,706,184 B2 | 3/2004 | Sale et al. | |
| 6,884,375 B2 * | 4/2005 | Wang et al. | 264/41 |
| 7,125,493 B2 | 10/2006 | Wang et al. | |
| 7,208,200 B2 | 4/2007 | Kools | |
| 7,229,665 B2 * | 6/2007 | Kools | 427/245 |
| 7,560,025 B2 * | 7/2009 | Kools | 210/500.42 |
| 7,743,929 B2 * | 6/2010 | Kools | 210/500.27 |
| 7,842,214 B2 * | 11/2010 | Romdhane et al. | 264/177.14 |
| 7,891,500 B2 * | 2/2011 | Kools | 210/490 |
| 8,061,532 B2 * | 11/2011 | Kools | 210/490 |
| 8,181,792 B2 * | 5/2012 | Kools | 210/490 |
| 2002/0063093 A1 | 5/2002 | Rice et al. | |
| 2002/0127387 A1 | 9/2002 | Sale et al. | |
| 2004/0118770 A1 | 6/2004 | Sale et al. | |
| 2006/0180543 A1 * | 8/2006 | Kools | 210/490 |
| 2011/0042299 A1 | 2/2011 | Zhang et al. | |

FOREIGN PATENT DOCUMENTS

| | | |
|---|---|---|
| EP | 0594007 A1 | 4/1994 |
| EP | 1609522 A2 | 12/2005 |
| JP | S62-019205 A | 1/1987 |
| JP | H02-021930 A | 1/1990 |
| JP | H05-057149 A | 3/1993 |
| JP | 2005-516754 A | 6/2005 |
| JP | 2006-503685 A | 2/2006 |
| JP | 2007/296525 A | 11/2007 |
| JP | 2003-534408 A | 11/2013 |
| KR | 100356896 B1 | 1/2003 |
| WO | WO 99/47246 A1 | 9/1999 |

| | | |
|---|---|---|
| WO | WO 01/89673 A2 | 11/2001 |
| WO | WO 03/031036 A2 | 4/2003 |
| WO | WO 2010-059327 A2 | 5/2010 |

OTHER PUBLICATIONS

Search Report, Singapore Application 201205843-4, mailed Feb. 1, 2013.
EP Search Report of Application No. 12182027.8, dated Jun. 3, 2013.
Notice of Reasons for Rejection, Patent Application No. P2012-175092 dated Jul. 22, 2013.
Notice of Non-Final Rejection, Korean Application No. 10-2012-0096295, dated Oct. 30, 2013.
Patent Examinatin Reprot No. 1, Australian Application No. 2012216385, issued Nov. 6, 2013.

* cited by examiner

*Primary Examiner* — Ana Fortuna
(74) *Attorney, Agent, or Firm* — Leydig, Voit & Mayer

(57) ABSTRACT

A microfiltration membrane comprising (a) an asymmetric layer, (b) an isometric layer, and (c) an interface layer between the asymmetric layer and the isometric layer, the interface layer having a first portion contacting the asymmetric layer and a second portion contacting the isometric layer; wherein, (i) the asymmetric layer has a region contacting the first portion of the interface layer, the region including cells having a first porous structure; (ii) the isometric layer has a region contacting the second portion of the interface layer, the region including cells having a second porous structure; the first porous structure being larger than the second porous structure; and the first portion of the interface layer comprises cells having the first porous structure, and the second portion of the interface layer comprises cells having the second porous structure, and methods of making and using the membrane, are disclosed. Also disclosed is a microfiltration membrane comprising (a) a first asymmetric layer, (b) a second asymmetric layer, and (c) an interface layer between the first asymmetric layer and the second asymmetric layer, the interface layer having a first portion contacting the first asymmetric layer and a second portion contacting the second asymmetric layer; wherein, (i) the first asymmetric layer has a region contacting the first portion of the interface layer, the region including cells having a first porous structure; (ii) the second asymmetric layer has a region contacting the second portion of the interface layer, the region including cells having a second porous structure; the first porous structure being larger than the second porous structure; and the first portion of the interface layer comprises cells having the first porous structure, and the second portion of the interface layer comprises cells having the second porous structure, as well as methods of making and using the membrane.

17 Claims, 7 Drawing Sheets

MULTILAYER MICROFILTRATION MEMBRANE

BACKGROUND OF THE INVENTION

Membranes having isotropic (symmetric) and anisotropic (asymmetric) structures, e.g., multiple layer and composite membranes, are known in the art. However, conventional membranes have not been suitable for some applications, e.g., they have not reliably provided one or more of the following: desired throughput, sterility grade filtration, and robustness.

The present invention provides for ameliorating at least some of the disadvantages of the prior art. These and other advantages of the present invention will be apparent from the description as set forth below.

BRIEF SUMMARY OF THE INVENTION

An embodiment of the invention provides a microfiltration membrane comprising (a) an asymmetric polymeric layer, (b) an isometric polymeric layer, and (c) an interface polymeric layer between the asymmetric layer and the isometric layer, the interface layer having a first portion contacting the asymmetric layer and a second portion contacting the isometric layer; wherein, (i) the asymmetric layer has a region contacting the first portion of the interface layer, the region including cells having a first porous structure; (ii) the isometric layer has a region contacting the second portion of the interface layer, the region including cells having a second porous structure; the first porous structure being larger than the second porous structure; and the first portion of the interface layer comprises cells having the first porous structure, and the second portion of the interface layer comprises cells having the second porous structure.

In some embodiments, the asymmetric polymeric layer and the isometric polymeric layer comprise different polymers, and the interface layer includes a first polymer from the asymmetric layer and a second, different, polymer from the isometric layer.

In some embodiments, the isometric layer has a thickness of at least about 50 micrometers and/or the asymmetric layer has a thickness in the range of about 10 to about 15 micrometers.

In some embodiments, the isotropic layer and the interface polymeric layer are each in the range of about 15% to about 33% of the total membrane thickness, and the asymmetric layer is in the range of about 60% to about 70% of the total thickness of the membrane.

Another embodiment of the invention provides a microfiltration membrane comprising (a) a first asymmetric polymeric layer, the first asymmetric polymeric layer having a first asymmetry ratio, (b) a second asymmetric polymeric layer, the second asymmetric polymeric layer having a second asymmetry ratio, wherein the second asymmetry ratio is greater than the first asymmetry ratio; and (c) an interface polymeric layer between the first asymmetric layer and the second asymmetric layer, the interface layer having a first portion contacting the first asymmetric layer and a second portion contacting the second asymmetric layer; wherein, (i) the first asymmetric layer has a region contacting the first portion of the interface layer, the region including cells having a first pore diameter; (ii) the second asymmetric layer has a region contacting the second portion of the interface layer, the region including cells having a second pore diameter; the first pore diameter being larger than the second pore diameter; and the first portion of the interface layer comprises cells having the first pore diameter, and the second portion of the interface layer comprises cells having the second pore diameter.

In some embodiments, the first asymmetric polymeric layer and the second asymmetric polymeric layer comprise different polymers, and the interface layer includes a first polymer from the first asymmetric layer and a second, different, polymer from the second asymmetric layer.

In some embodiments, the first asymmetric polymeric layer has an asymmetry ratio in the range of about 0.5 to about 1.5 and/or the second asymmetric polymeric layer has an asymmetry ratio of about 2 or more.

In some embodiments including first and second asymmetric layers, the first asymmetric layer and the interface polymeric layer together are about 8% to about 15% of the total membrane thickness, and the second asymmetric layer is about 75% to about 90% of the total membrane thickness.

In some embodiments, the membrane comprises a pleated membrane.

A method of making a microfiltration membrane having an asymmetric layer, an isometric layer, and an interface layer, the interface layer having a first portion contacting the asymmetric layer and a second portion contacting the isometric layer according to an embodiment of the invention comprises (a) preparing a first solution comprising a first polymer and a solvent for the first polymer; (b) preparing a second solution comprising a second polymer and a solvent for the second polymer; (c) casting the first solution onto a first surface of a support; (d) after a short time interval, casting the second solution on the first solution and forming a pre-membrane; (e) exposing the pre-membrane to circulating air; and, (f) effecting phase separation of the first solution and the second solution in a nonsolvent liquid. The first and second polymers can be the same, or different.

In another embodiment, a method of making a microfiltration membrane having a first asymmetric layer having a first asymmetry ratio, a second asymmetric layer having a second asymmetry ratio wherein the second asymmetry ratio is greater than the first asymmetry ratio, and an interface layer, the interface layer having a first portion contacting the first asymmetric layer and a second portion contacting the second asymmetric layer according to an embodiment of the invention comprises (a) preparing a first solution comprising a first polymer and a solvent for the first polymer; (b) preparing a second solution comprising a second polymer and a solvent for the second polymer; (c) casting the first solution onto a first surface of a support; (d) after a short time interval, casting the second solution on the first solution and forming a pre-membrane; and, (e) effecting phase separation of the first solution and the second solution in a nonsolvent liquid. The first and second polymers can be the same, or different.

In another embodiment, a method of using the membrane, e.g., to process fluid, is provided.

BRIEF DESCRIPTION OF THE SEVERAL VIEWS OF THE DRAWING(S)

DETAILED DESCRIPTION OF THE INVENTION

Figure 1:
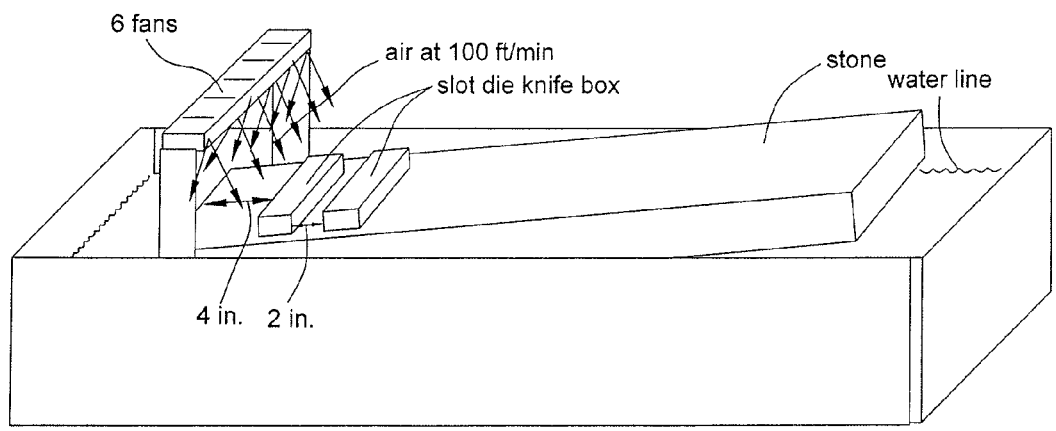
FIG. 1 shows an illustrative generalized system for preparing membranes according to an embodiment of the invention, showing a bed, first and second slot dies, fans, and a quench bath.

Advantageously, membranes according to the invention have (a) an asymmetric layer including a narrow asymmetry range with a gradual change in asymmetry, a sharp demarcation between the pore structures in the asymmetric layer and in the isometric layer, and good adhesion between the layers; or (b) a first asymmetric layer including a narrow asymmetry range with a gradual change in asymmetry and a second asymmetric layer including a wider asymmetry range, a sharp demarcation between the pore structures in the first asymmetric layer and in the second asymmetric layer, and good adhesion between the layers. As a result, robust membranes exhibiting high throughput, and, if desired, providing sterile grade filtration, can be obtained.

In accordance with an embodiment of the present invention, a microfiltration membrane is provided, comprising (a) an asymmetric polymeric layer, (b) an isometric polymeric layer, and (c) an interface polymeric layer between the asymmetric layer and the isometric layer, the interface layer having a first portion contacting the asymmetric layer and a second portion contacting the isometric layer; wherein, (i) the asymmetric layer has a region contacting the first portion of the interface layer, the region including cells having a first pore diameter; (ii) the isometric layer has a region contacting the second portion of the interface layer, the region including cells having a second pore diameter; the first pore diameter being larger than the second pore diameter; and the first portion of the interface layer comprises cells having the first pore diameter, and the second portion of the interface layer comprises cells having the second pore diameter.

In some embodiments, the asymmetric polymer layer has a first concentration and/or a first viscosity of a polymer, the isometric polymeric layer has a second concentration and/or a second viscosity of a polymer, and interface layer comprises a mixture of the first and second concentrations and/or a mixture of the first and second viscosities of the polymer.

Alternatively, or additionally, in some embodiments, the interface membrane includes a first polymer from the asymmetric layer and a second, different, polymer from the isometric layer.

In some embodiments of the membrane, the isometric layer has a thickness of at least about 50 micrometers and/or the asymmetric layer has a thickness in the range of about 10 to about 15 micrometers.

In an embodiment, the asymmetric layer is at least about 70% of the membrane thickness and/or the isometric layer is at least about 30% of the membrane thickness.

The asymmetric layer of the membrane can have an asymmetry of about 2 or more, or about 3 or more. In some embodiments, the asymmetry is in the range of from about 10 to about 20.

Another embodiment of the invention provides a microfiltration membrane comprising (a) a first asymmetric polymeric layer, the first asymmetric polymeric layer having a first asymmetry ratio, (b) a second asymmetric polymeric layer, the second asymmetric polymeric layer having a second asymmetry ratio, wherein the second asymmetry ratio is greater than the first asymmetry ratio; and (c) an interface polymeric layer between the first asymmetric layer and the second asymmetric layer, the interface layer having a first portion contacting the first asymmetric layer and a second portion contacting the second asymmetric layer; wherein, (i) the first asymmetric layer has a region contacting the first portion of the interface layer, the region including cells having a first pore diameter; (ii) the second asymmetric layer has a region contacting the second portion of the interface layer, the region including cells having a second pore diameter; the first pore diameter being larger than the second pore diameter; and the first portion of the interface layer comprises cells having the first pore diameter, and the second portion of the interface layer comprises cells having the second pore diameter.

In some embodiments, the first asymmetric polymeric layer and the second asymmetric polymeric layer comprise different polymers, and the interface layer includes a first polymer from the first asymmetric layer and a second, different, polymer from the second asymmetric layer.

In some embodiments, the first asymmetric polymeric layer has an asymmetry ratio in the range of about 0.5 to about 1.5 and/or the second asymmetric polymeric layer has an asymmetry ratio of about 2 or more.

In some embodiments, the membrane comprises a pleated membrane.

In another embodiment, a method of using the membrane is provided. For example, a method of processing a fluid according to an embodiment of the invention comprises passing the fluid into the membrane, in the direction from the asymmetric layer toward the isometric layer, or in the direction from the second asymmetric layer toward the first asymmetric layer, in a more preferred embodiment, the method comprises passing the fluid through the membrane.

In yet another embodiment, a method of making a microfiltration membrane having an asymmetric layer, an isometric layer, and an interface layer, the interface layer having a first portion contacting the asymmetric layer and a second portion contacting the isometric layer, comprises (a) preparing a first solution comprising a first polymer and a solvent for the first polymer; (b) preparing a second solution comprising a second polymer and a solvent for the second polymer; (c) casting the first solution onto a first surface of a support; (d) after about 2 seconds, casting the second solution on the first solution and forming a pre-membrane; (e) exposing the pre-membrane to circulating air; and, (f) effecting phase separation of the first solution and the second solution in a nonsolvent liquid.

In another embodiment, a method of making a microfiltration membrane having a first asymmetric layer having a first asymmetry ratio, a second asymmetric layer having a second asymmetry ratio wherein the second asymmetry ratio is greater than the first asymmetry ratio, and an interface layer, the interface layer having a first portion contacting the first asymmetric layer and a second portion contacting the second asymmetric layer according to an embodiment of the invention comprises (a) preparing a first solution comprising a first polymer and a solvent for the first polymer; (b) preparing a second solution comprising a second polymer and a solvent for the second polymer; (c) casting the first solution onto a first surface of a support; (d) after a short time interval, casting the second solution on the first solution and forming a pre-membrane; and, (e) effecting phase separation of the first solution and the second solution in a nonsolvent liquid. The first and second polymers can be the same, or different.

The first and second polymers can be the same, or different. In some embodiments of the method, the first solution has a first concentration and/or a first viscosity of the first polymer, and the second solution has a second concentration and/or a second viscosity of the second polymer.

In a preferred embodiment of the method casting the first solution comprises casting the first solution through first preset gap provided by a first slot die or a first casting knife, and casting the second solution comprises casting the second solution through a second preset gap provided by a second slot die or a second casting knife.

In a more preferred embodiment of the method, at least one solution comprises a polysulfone.

Each of the components of the invention will now be described in more detail below, wherein like components have like reference numbers.

The solutions comprising the polymers are typically cast into thin films, one on top of the other, exposed to a gaseous environment for a predetermined period of time, followed by quenching in a nonsolvent for the polymers. Preferably, the first solution is spread in a layer (bottom layer) onto a support (such as a nonporous support), and the second solution is spread in a layer (upper layer) onto the first solution, and the membrane can be later separated from the support after quenching. However, the support (porous or non-porous) can be incorporated into the final structure if desired.

The membranes can be cast manually (e.g., poured, cast, or spread by hand onto a casting surface and quench liquid applied onto the surface) or automatically (e.g., poured or otherwise cast onto a moving bed). One example of a suitable support is polyethylene coated paper.

There should be a time interval of greater than 1 second, preferably greater than 1.5 seconds, between casting the first solution, and casting the second solution on the first solution. Preferably, the time interval is about 2 seconds or more. For example, the time interval can be in the range of from about 2 seconds to about 35 seconds, or about 2 seconds to about 10 seconds.

A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot. Illustratively, the first and second solutions comprising polymers can be separately cast by means of a doctor blade with knife gaps in the range from about 120 micrometers to about 500 micrometers, more typically in the range from about 180 micrometers to about 400 micrometers. The knife gaps can be different for the first and second solutions.

A variety of air gaps are suitable for use in the invention, and the air gaps can be the same for the same for the knives/doctor blades, or different. Typically, the air gaps are in the range of from about 3 inches to about 12 inches, more typically, in the range of from about 3.5 inches to about 6 inches.

A variety of casting speeds are suitable as is known in the art. Typically, the casting speed is at least about 2 feet per minute (fpm), e.g., with knife air gaps of at least about 3 inches.

Illustratively, using a time interval of about 2 seconds between casting the first and second solutions, the air gap can be in the range of from about 4 inches 16 inches, with casting speeds in the range of from about 2.5 fpm to about 10 fpm. In another illustration, using a time interval of about 10 seconds between casting the first and second solutions, the air gap can be in the range of from about 4 inches 8 inches, with casting speeds in the range of from about 10 fpm to about 20 fpm. Of course, the time interval can be longer than about 2 seconds, and the air gaps and/or casting speeds can be less or greater than the illustrative values listed above.

Preferably, the cast solutions are exposed to air after casting but before quenching. The air exposure time is typically in the range of from about 2 seconds to about 35 seconds. Typically, the air is humid (e.g., greater than about 60% relative humidity). Preferably, in those embodiments wherein the membrane comprises an asymmetric layer and an isometric layer, the air, e.g., humid air, is circulated (for example, using one or more fans) to enhance contact with the cast solutions. Preferably, in those embodiments wherein the membrane comprises a first asymmetric layer and a second asymmetric layer, the air is not circulated.

The support with the cast solutions thereon is immersed in a quenching bath to effect phase separation of the polymer solutions in a continuously layered sequence to form an integral multilayer (i.e., layers bonded together such that the membrane behaves as a single structure that does not delaminate or separate under normal use conditions) microporous polymeric membrane. After formation, the membrane is typically washed (e.g., in deionized water) to remove residual solvent), dried, and wound onto a core.

The quenching liquid is typically water, the temperature of which is typically greater than that of the casting temperature. In the quenching bath, precipitation or coagulation occurs from the liquid film surface that first contacts the bath and then through the subsequent layer. Each layer dilutes and changes the quenching fluid as the quenching fluid diffuses through the layers.

Suitable solutions including polymers can include polymers such as, for example, polyaromatics; sulfones (e.g., polysulfones, including aromatic polysulfones such as, for example, polyethersulfone (PES), bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles (including polyalkylacrylonitriles), cellulosic polymers (such as cellulose acetates and cellulose nitrates), fluoropolymers, and PEEK. Solutions comprising polymers can include a mixture of polymers, e.g., a hydrophobic polymer (e.g., a sulfone polymer) and a hydrophilic polymer (e.g., polyvinylpyrrolidone).

Typically, the solutions comprising polymers have optical densities of about 0.05 or greater at room temperatures at 310 nm, e.g., the densities can be in the range of from about 0.01 to about 0.3 at 310 nm. In some embodiments, the first cast solution (forming the bottom layer) has a higher optical density than the later cast solution (forming an upper layer).

In addition to one or more polymers, typical solutions comprise at least one solvent, and may further comprise at least one non-solvent. Suitable solvents include, for example, dimethyl formamide (DMF); N,N-dimethylacetamide (DMAC); N-methyl pyrrolidone (NMP); tetramethylurea;

dioxane; diethyl succinate; dimethylsulfoxide; chloroform; and tetrachloroethane; and mixtures thereof. Suitable nonsolvents include, for example, water; various polyethylene glycols (PEGs; e.g., PEG-400, PEG-1000); various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; and various salts, such as calcium chloride, magnesium chloride, and lithium chloride; and mixtures thereof.

If desired, a solution comprising a polymer can further comprise, for example, one or more polymerization initiators (e.g., any one or more of peroxides, ammonium persulfate, aliphatic azo compounds (e.g., 2,2'-azobis(2-amidinopropane)dihydrochloride (V50)), and combinations thereof), and/or minor ingredients such as surfactants and/or release agents.

Suitable components of solutions are known in the art. Illustrative solutions comprising polymers, and illustrative solvents and nonsolvents include those disclosed in, for example, U.S. Pat. Nos. 5,846,422; 5,906,742; 5,928,774; 6,045,899; and 6,146,747.

In accordance with the invention, layers of the membrane can be formed from the same polymer and solvent, varying the viscosity, additives, and treatment, or different polymers can be used for different layers.

An isometric layer has a porous structure with a distribution characterized by an average pore structure that is substantially the same through the layer. For example, with respect to pore diameter, an isometric layer has a pore diameter distribution characterized by a pore diameter that is substantially the same through the layer.

An asymmetric layer has a pore structure (typically, a pore diameter) varying throughout the layer. Typically, the pore diameter decreases in diameter from one portion or surface to another portion or surface (e.g., the pore diameter of the cells decreases from the upstream portion or surface to the downstream portion or surface). However, other types of asymmetry are encompassed by embodiments of the invention, e.g., the pore diameter goes through a minimum pore diameter at a position within the thickness of the asymmetric layer. The asymmetric layers can have any suitable pore diameter gradient or ratio, e.g., about 0.5 or more, about 3 or more, or about 7 or more, or in the range from about 0.5 to about 1.5, about 2:1 to about 20:1, or in the range of from about 3:1 to about 10:1. This asymmetry can be measured by comparing the pore diameter on one major surface of a layer with the pore diameter of the other major surface of that layer.

Typically, an isotropic layer has a pore structure (typically, a pore diameter) in the range of from about 0.02 micrometers to about 0.3 micrometers.

The thickness of each layer can be varied within a wide range while still obtaining a self-supporting, integral multilayer membrane. Typically, the multilayer membrane has a thickness of at least about 50 micrometers, more typically, at least about 75 micrometers, and preferably, at least about 100 micrometers. Typically, in those embodiments including an isotropic layer, the isotropic layer and interface polymeric layers are each in the range of about 15% to about 33% of the total membrane thickness, and the asymmetric layer is in the range of about 60% to about 70% of the total thickness of the membrane. Typically, in those embodiments including first and second asymmetric layers, the first asymmetric layer and interface polymeric layers together are about 8% to about 15% of the total membrane thickness, and the second asymmetric layer is about 75% to about 90% of the total membrane thickness.

In accordance with embodiments of the invention, filters and filter elements are also provided, wherein the filter and filter elements comprise at least one membrane according to the invention.

A membrane according to the invention, (as well as filter element comprising at least one membrane) can have any suitable pore structure, e.g., a pore size (for example, as evidenced by porometry (for example, mercury porometry or capillary condensation flow porometry), or by bubble point, or by $K_L$ as described in, for example, U.S. Pat. No. 4,340,479), a pore rating, a pore diameter (e.g., when characterized using the modified OSU F2 test as described in, for example, U.S. Pat. No. 4,925,572, or using a porometer), or removal rating that reduces or allows the passage therethrough of one or more materials of interest as the fluid is passed through the element. The desired pore structure depends on the composition of the fluid to be treated, and the desired effluent level of the treated fluid.

The membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. For applications wherein liquid passes through the membrane, the membrane is preferably hydrophilic (either as made, or post-treatment), having a CWST of 72 dynes/cm ($72 \times 10^{-5}$ N/cm) or more, more preferably, having a CWST of about 78 dynes/cm (about $78 \times 10^{-5}$ N/cm) or more. However, for some other application wherein liquid does not pass through the membrane (e.g., for venting applications), the membrane can be hydrophobic, having a CWST of less than 72 dynes/cm ($72 \times 10^{-5}$ N/cm).

The surface characteristics of the membrane can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van der Graff generator, ultraviolet light, electron beam, or to various other forms of radiation, or by surface etching or deposition using a plasma treatment.

Membranes according to embodiments of the invention can be used in a variety of applications, including, for example, sterile filtration applications, filtering fluids for the electronics industry, filtering fluids for the pharmaceutical industry, filtering fluids for the food and beverage industry, clarification, filtering antibody- and/or protein-containing fluids, filtering cell culture fluids, and venting.

A filter and/or a filter element comprising at least one membrane according to the invention can include additional elements, layers, or components, that can have different structures and/or functions, e.g., at least one of prefiltration, support, drainage, spacing and cushioning. Illustratively, the filter can also include at least one additional element such as a mesh and/or a screen.

In accordance with embodiments of the invention, the membrane, filter, and/or filter element can have a variety of configurations, including planar, pleated, and hollow cylindrical.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. Preferably, the filter device is sterilizable. Any housing of suitable shape and providing at least one inlet and at least one outlet may be employed.

The following examples further illustrate the invention but, of course, should not be construed as in any way limiting its scope.

In the following Examples, membranes are produced using a system arranged as generally shown in FIG. 1. The casting solutions are described in the respective examples. Membranes are cast onto paper using a casting knife. Knife 1 and knife 2 are used at preset air gaps and the conditions as listed below. Six fans are used to provide air velocity. Following casting, the membranes are quenched in a water bath (quench temperature of the water bath is 105° F. (about 41° C.)) for about 6 minutes till membrane is coagulated. The membranes are further washed with deionized water overnight and then oven dried.

The pore diameters are analyzed using a Quantachrome PoreMaster® Series mercury intrusion porosimeter (Boynton Beach, Fla.), and a Porvair Porometer (Porvair plc, Norfolk, UK).

The casting conditions for Examples 1-5 are as follows:

|  | Example 1 | Ex. 2 | Ex. 3 | Ex. 4 | Ex. 5 |
| --- | --- | --- | --- | --- | --- |
| Knife air gap 1 (inch) | 4 | 4 | 4 | 4 | 3 |
| Knife air gap 2 (inch) | 4 | 4 | 4 | 4 | 4 |
| Knife gap 1 (mil) | 12 | 12 | 12 | 12 | 12 |
| Knife gap 2 (mil) | 10 | 9 | 10 | 10 | 9 |
| Air velocity (ft/min) | 50 | 50 | 70 | 100 | 100 |
| Quench Temp (° F.) | 105 | 105 | 105 | 105 | 105 |
| Casting Speed (fpm) | 9 | 9 | 9 | 9 | 11 |

Example 1

This example describes making a membrane having an isometric polymeric layer, an asymmetric polymer layer, and an interface layer, wherein the asymmetric layer has a region contacting a first portion of the interface layer, the region including cells having a first pore diameter; the isometric layer has a region contacting another portion of the interface layer, the region including cells having a second pore diameter; the first pore diameter being larger than the second pore diameter; and the first portion of the interface layer comprises cells having the first pore diameter, and the second portion of the interface layer comprises cells having the second pore diameter, according to an embodiment of the present invention.

Solution 1 (top) consists of 11.5% PES, 5% water, 0.5% sulfonated PES (SPES), 3% PVP (polyvinyl pyrrolidone) (k-90), 25% PEG200, and 55% NMP. Solution 2 (bottom) consists of 11% PES, 5% water, 5% PVP (k-90), 25% PEG200, and 54% NMP.

Figure 2:
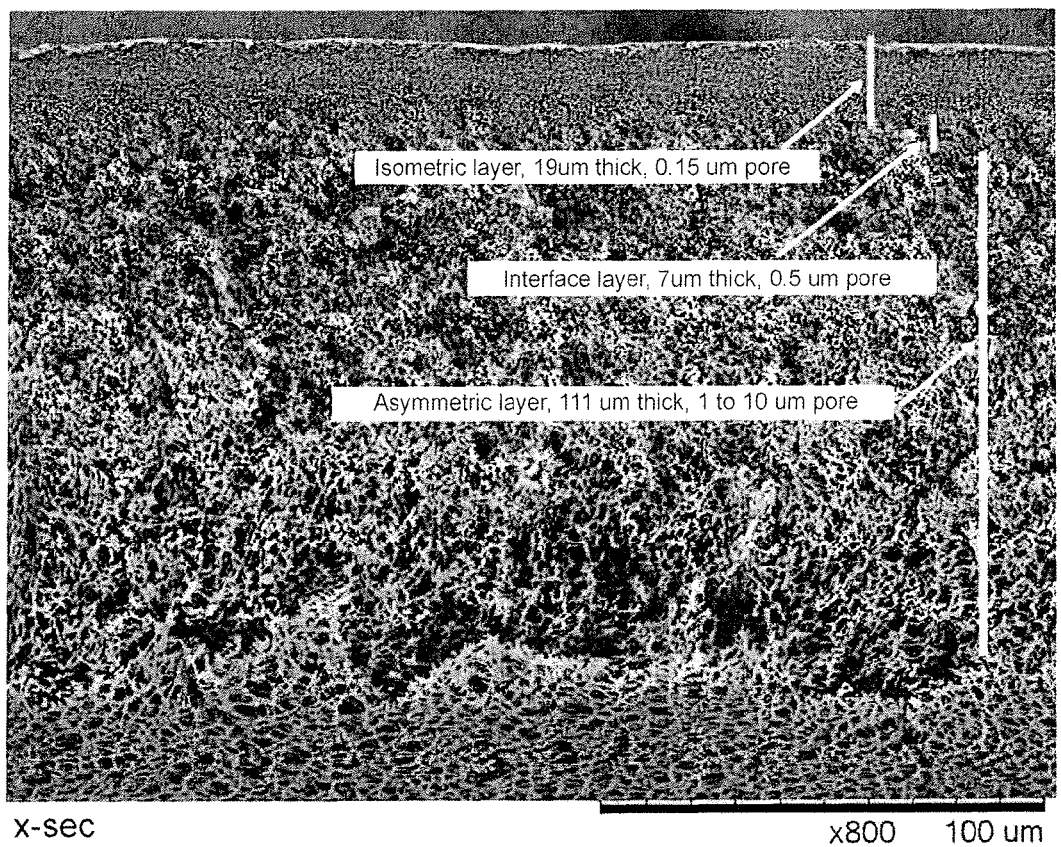
FIG. 2 shows a scanning electron microscope (SEM) cross-sectional view of an embodiment of a membrane according to the present invention, wherein the membrane has an isometric layer, an asymmetric layer, and an interface layer.

A SEM cross-sectional view of the membrane is shown in FIG. 2.

The isometric layer is 19 micrometers (μm) thick, and the pore diameter is 0.15 μm. The interface layer is 7 μm thick, with the region of the interface layer contacting the isometric layer having 0.15 μm pore diameter cells, the region of the interface layer contacting the asymmetric layer having 1 μm pore diameter cells, and the region of the interface layer between the two regions having a pore diameter of 0.5 μm. The asymmetric layer is 111 μm thick, with the region of the asymmetric layer contacting the interface layer having a pore diameter of 1 μm, and the other surface of the asymmetric layer having a pore diameter of 10 μm (asymmetry ratio=10).

Example 2

This example describes making a membrane having an isometric polymeric layer, an asymmetric polymer layer, and an interface layer, wherein the asymmetric layer has a region contacting a first portion of the interface layer, the region including cells having a first pore diameter; the isometric layer has a region contacting another portion of the interface layer, the region including cells having a second pore diameter; the first pore diameter being larger than the second pore diameter; and the first portion of the interface layer comprises cells having the first pore diameter, and the second portion of the interface layer comprises cells having the second pore diameter, according to another embodiment of the present invention.

Solution 1 (top) consists of 11.5% PES, 5% water, 0.5% sulfonated PES (SPES), 3% PVP (k-90), 25% PEG200, and 55% NMP. Solution 2 (bottom) consists of 11% PES, 5% water, 5% PVP (k-90), 25% PEG200, and 54% NMP.

Figure 3:
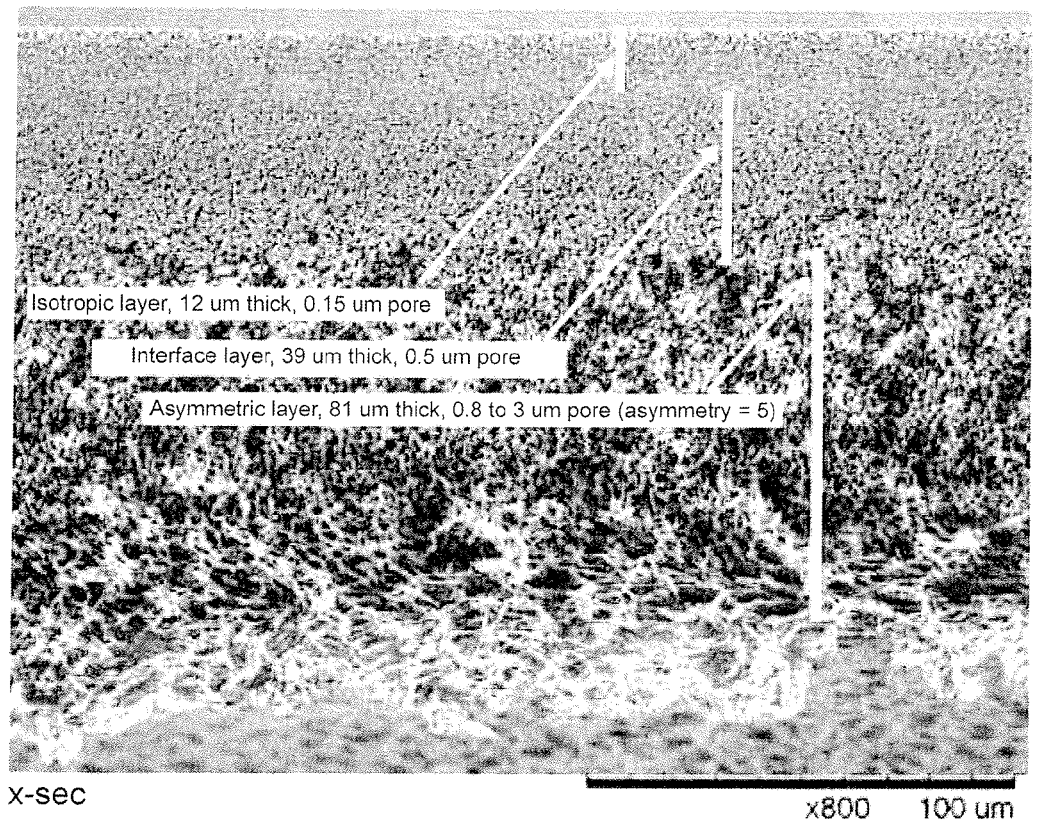
FIG. 3 shows a scanning electron microscope (SEM) cross-sectional view of another embodiment of a membrane according to the present invention, wherein the membrane has an isometric layer, an asymmetric layer, and an interface layer.

A SEM cross-sectional view of the membrane is shown in FIG. 3.

The isometric layer is 12 μm thick, and the pore diameter is 0.15 μm. The interface layer is 39 μm thick, with the region of the interface layer contacting the isometric layer having 0.15 μm pore diameter cells, the region of the interface layer contacting the asymmetric layer having 0.6 μm pore diameter cells, and the region of the interface layer between the two regions having a pore diameter of 0.5 μm. The asymmetric layer is 81 μm thick, with the region of the asymmetric layer contacting the interface layer having a pore diameter of 0.6 μm, and the other surface of the asymmetric layer having a pore diameter of 3 μm (asymmetry ratio=5).

Example 3

This example describes making a membrane according to another embodiment of the invention, the membrane having an isometric polymeric layer, an asymmetric polymer layer, and an interface layer, wherein the asymmetric layer has a region contacting a first portion of the interface layer, the region including cells having a first pore diameter; the isometric layer has a region contacting another portion of the interface layer, the region including cells having a second pore diameter; the first pore diameter being larger than the second pore diameter; and the first portion of the interface layer comprises cells having the first pore diameter, and the second portion of the interface layer comprises cells having the second pore diameter.

Solution 1 (top) consists of 11.5% PES, 5% water, 0.5% sulfonated PES (SPES), 3% PVP (k-90), 25% PEG200, and 55% NMP. Solution 2 (bottom) consists of 11% PES, 5% water, 5% PVP (k-90), 25% PEG200, and 54% NMP.

Figure 4:
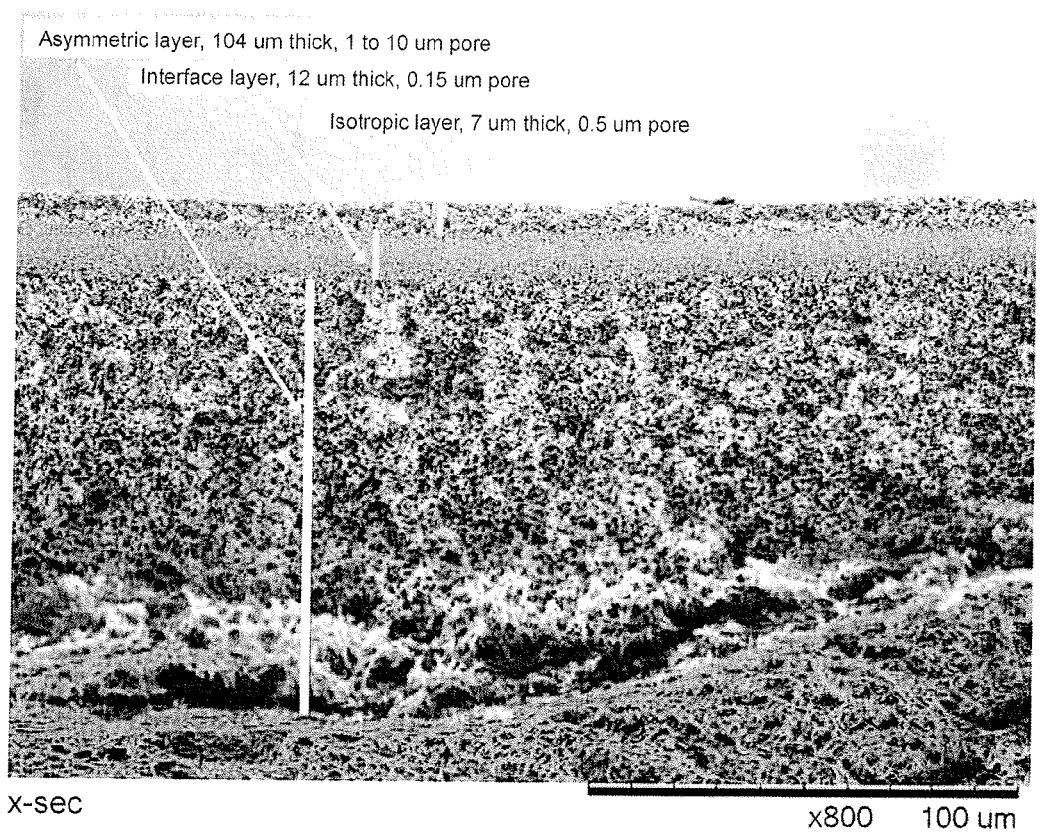
FIG. 4 shows another SEM cross-sectional view of another embodiment of the present invention, wherein the membrane has an isometric layer, an asymmetric layer, and an interface layer.

A SEM cross-sectional view of the membrane is shown in FIG. 4.

The isometric layer is 7 μm thick, and the pore diameter is 0.5 μm. The interface layer is 12 μm thick, with the region of the interface layer contacting the isometric layer having 0.5 μm pore diameter cells, the region of the interface layer contacting the asymmetric layer having 1 μm pore diameter cells, and the region of the interface layer between the two regions having a pore diameter of 0.15 μm. The asymmetric layer is 104 μm thick, with the region of the asymmetric layer contacting the interface layer having a pore diameter of 1 μm, and the other surface of the asymmetric layer having a pore diameter of 10 μm (asymmetry ratio=10).

Example 4

This example describes making a membrane according to another embodiment of the invention.

Solution 1 (top) 10.8% PES, 5% water, 3% glycerine, 25% PEG200, 0.05% V-50 (2,2'-azobis(2-amidinopropane)dihydrochloride azo initiator from Wako Chemical, Richmond, Va.), 0.1% HEMA (hydroxylethylmethacrylate), 0.3% PEGDMA (polyethylene glycol dimethacrylate), 0.2% PTA (pentaerythritol tetraacrylate from Aldrich Chemical Co., Milwaukee, Wis.), and balance of NMP to 100%. Solution 2 (bottom) consists of 11% PES, 5% water, 5% PVP (k-90), 25% PEG200, and 54% NMP.

Figure 5:
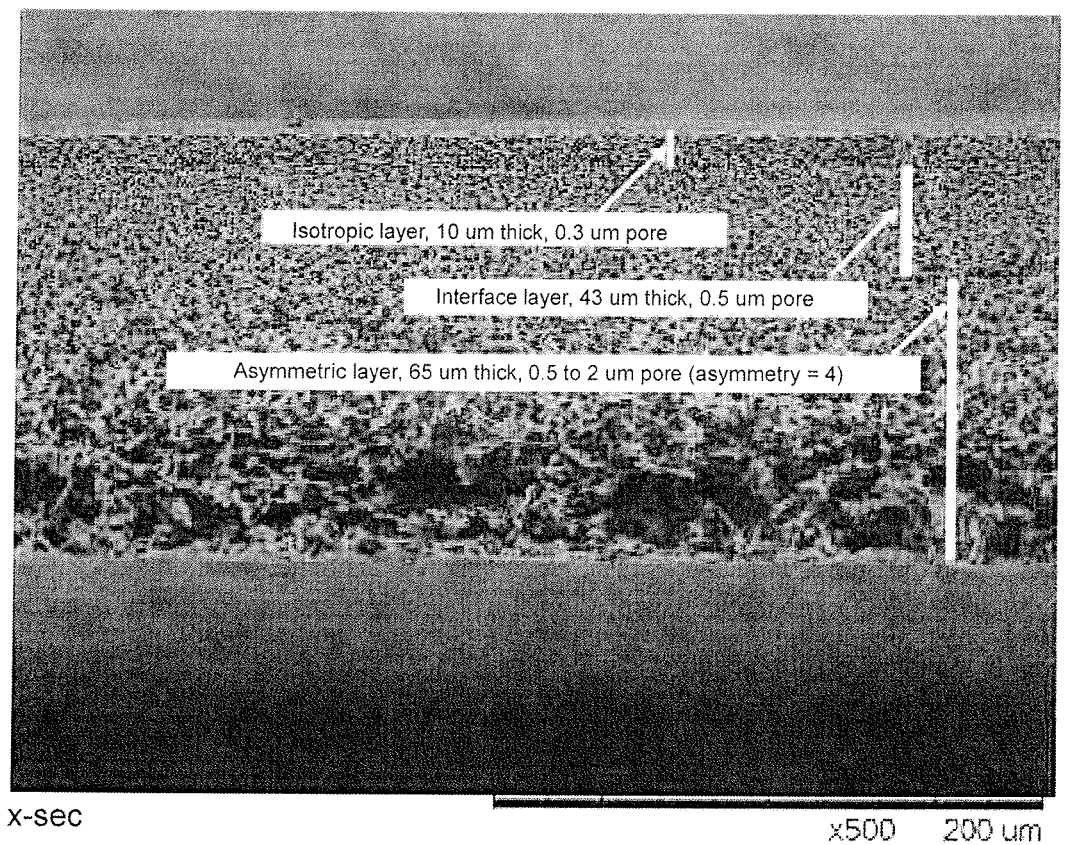
FIG. 5 shows a scanning electron microscope (SEM) cross-sectional view of another embodiment of a membrane according to the present invention, wherein the membrane has an isometric layer, an asymmetric layer, and an interface layer.

A SEM cross-sectional view of the membrane is shown in FIG. 5.

The isometric layer is 10 μm thick, and the pore diameter is 0.3 μm. The interface layer is 43 μm thick, with the region of the interface layer contacting the first isometric layer having 0.3 μm pore diameter cells, the region of the interface layer contacting the asymmetric layer having 0.5 μm pore diameter cells, and the region of the interface layer between the two regions having a pore diameter of 0.5 μm. The asymmetric layer is 65 μm thick, with the region of the asymmetric layer contacting the interface layer having a pore diameter of 0.5 μm, and the other surface of the asymmetric layer having a pore diameter of 2 μm (asymmetry ratio=4).

Example 5

This example describes making a membrane according to another embodiment of the invention.

Solution 1 (top) 10.8% PES, 5% water, 3% glycerine, 25% PEG200, 0.05% V-50 (azo initiator from Wako Chemical), 0.1% HEMA, 0.3% PEGDMA, 0.2% PTA (pentaerythritol tetraacrylate from Aldrich Chemical Company), and balance of NMP to 100%. Solution 2 (bottom) consists of 11% PES, 5% water, 5% PVP (k-90), 25% PEG200, and 54% NMP.

Figure 6:
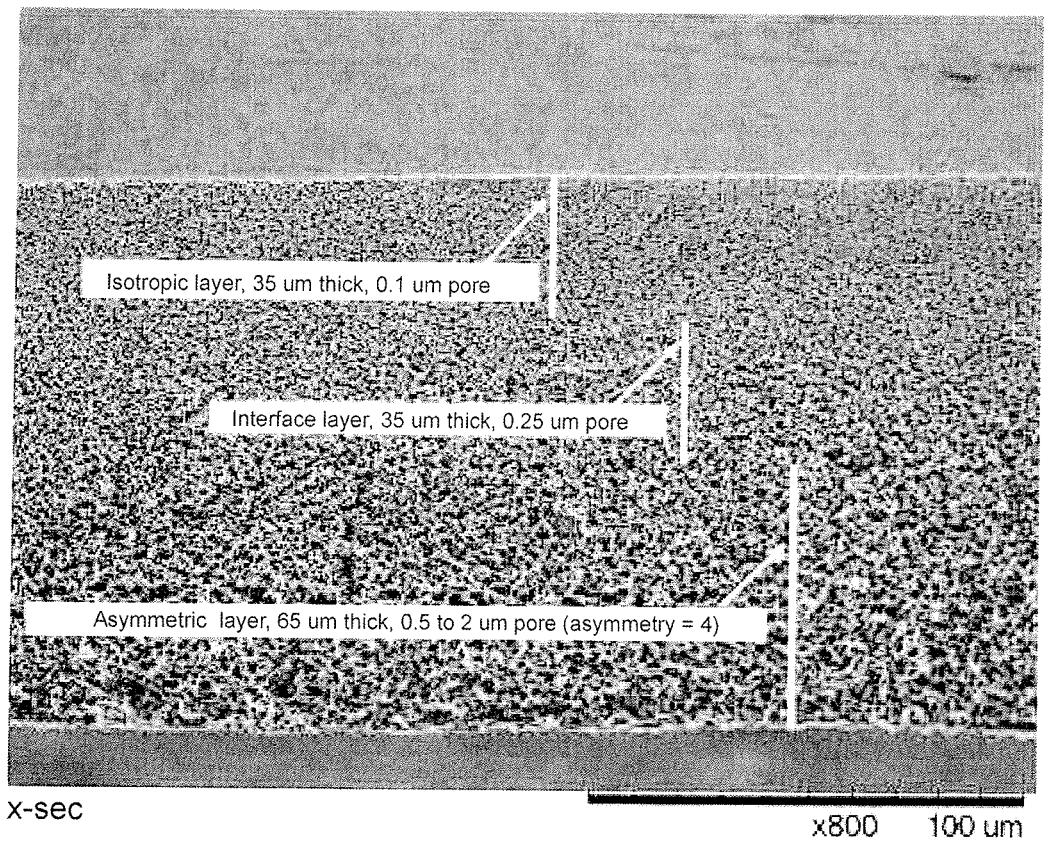
FIG. 6 shows another SEM cross-sectional view of another embodiment of a membrane according to the present invention, wherein the membrane has an isometric layer, an asymmetric layer, and an interface layer.

A SEM cross-sectional view of the membrane is shown in FIG. 6.

The isometric layer is 35 μm thick, and the pore diameter is 0.1 μm. The interface layer is 35 μm thick, with the region of the interface layer contacting the first isometric layer having 0.1 μm pore diameter cells, the region of the interface layer contacting the asymmetric layer having 0.5 μm pore diameter cells, and the region of the interface layer between the two regions having a pore diameter of 0.25 μm. The asymmetric layer is 65 μm thick, with the region of the asymmetric layer contacting the interface layer having a pore diameter of 0.5 μm, and the other surface of the asymmetric layer having a pore diameter of 2 μm (asymmetry ratio=4).

Example 6

This example describes preparing a membrane having first and second asymmetric layers, and an interface layer, wherein the first asymmetric layer has a region contacting a first portion of the interface layer, the region including cells having a first pore diameter; the second asymmetric layer has a region contacting another portion of the interface layer, the region including cells having a second pore diameter; the first pore diameter being larger than the second pore diameter; and the first portion of the interface layer comprises cells having the first pore diameter, and the second portion of the interface layer comprises cells having the second pore diameter, according to an embodiment of the invention.

The system used for producing this membrane differs from that shown in FIG. 1 in that fans are not used, i.e., the air is not circulated.

The following solutions are used:

Solution 1 (top) 10.7% Polysulfone, 16.1% t-amyl alcohol, and 73.2% DMF. Solution 2 (bottom) consists of 11% PES, 5% water, 5% PVP (k-90), 25% PEG200, and 54% NMP.

The casting conditions for Example 6 are as follows:

| | |
|---|---|
| Knife Air gap 1 (inch) | 1 |
| Knife Air gap 2 (inch) | 4 |
| Knife gap 1 (mil) | 13 |
| Knife gap 2 (mil) | 12 |
| Air Velocity (ft/min) | none |
| Quench Temp (° F.) | 80 |
| Casting Speed (fpm) | 5 |

Figure 7:
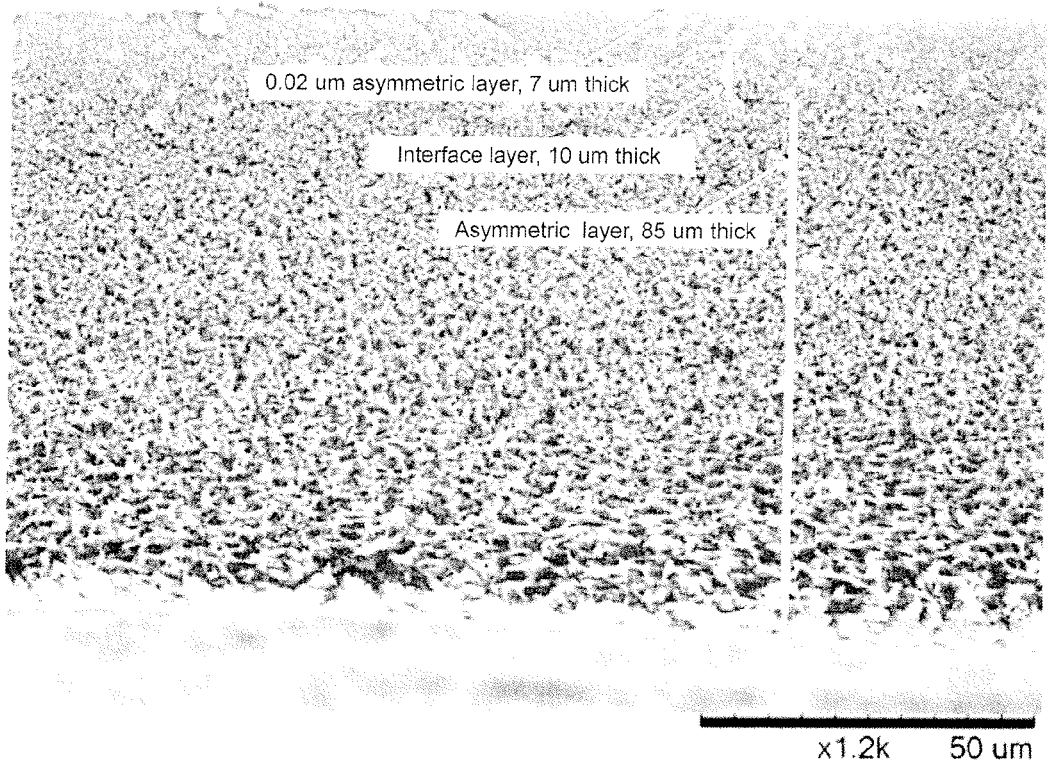
FIG. 7 shows another SEM cross-sectional view of another embodiment of a membrane according to the present invention, wherein the membrane has first and second asymmetric layers, and an interface layer.

A SEM cross-sectional view of the membrane is shown in FIG. 7.

The first asymmetric layer is 7 μm thick, and the portion of the first asymmetric layer contacting the interface layer has cells with a pore diameter of 0.02 μm and the pore diameter at the other surface is 0.05 μm (asymmetry ratio=2.5).

The interface layer is 10 μm thick, with the region of the interface layer contacting the first asymmetric layer having 0.05 μm pore diameter cells, the region of the interface layer contacting the second asymmetric layer having 0.1 μm pore diameter cells. The second asymmetric layer is 85 μm thick, with the region of the asymmetric layer contacting the interface layer having a pore diameter of 0.1 μm, and the other surface of the asymmetric layer having a pore diameter of 0.5 μm (asymmetry ratio=5).

Example 7

The Example shows the good water flow and throughput provided by a membrane according to an embodiment of the invention.

A membrane is produced as described in Example 3. Additionally, commercially available isometric and asymmetric membranes are obtained. The isometric membrane is a SUPOR® 200 polyether sulfone membrane, having a pore diameter of 0.2 μm, and the asymmetric membrane is a BTS-55 polysulfone membrane, having a pore diameter at the skin surface of 0.2 μm, and a pore diameter at the other surface of 20 μm (asymmetry ratio=10), both available from Pall Corporation (East Hills, N.Y.).

A 1% treacle solution is prepared (5 grams treacle (Lyle's black Treacle, Notts, UK); dissolved in 495 grams deionized water (DI)). The membranes are placed in test cells, the test system is purged, and the throughput is determined at 3 psi for 10 minutes.

Additionally, the DI water flow in ml/min at 10 psi for a 90 mm disc is determined, as is the $K_L$ bubble point in psi, and the MFP (mean flow pore) size in μm.

The results are as follows:

The inventive membrane has a 1% treacle throughput at 3 psi for 10 minutes of 220; a DI water flow of 2800 ml/min at 10 psi; a $K_L$ bubble point of 50 psi, and an MFP size of 0.27 μm.

The isometric membrane has a 1% treacle throughput at 3 psi for 10 minutes of 10; a DI water flow of 1200 ml/min at 10 psi; a $K_L$ bubble point of 55 psi, and an MFP size of 0.25 μm.

The asymmetric membrane has a 1% treacle throughput at 3 psi for 10 minutes of 45; a DI water flow of 1600 ml/min at 10 psi; a $K_L$ bubble point of 55 psi, and an MFP size of 0.24 µm.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A microfiltration membrane comprising
   (a) an asymmetric polymeric layer,
   (b) an isometric polymeric layer, and
   (c) a polymeric interface layer between the asymmetric layer and the isometric layer, the interface layer having a first portion contacting the asymmetric layer and a second portion contacting the isometric layer;
   wherein the membrane has a total membrane thickness; and,
   (i) the asymmetric layer has a region contacting the first portion of the interface layer, the region including cells having a first pore diameter;
   (ii) the isometric layer has a region contacting the second portion of the interface layer, the region including cells having a second pore diameter;
   the first pore diameter being larger than the second pore diameter; and
   the first portion of the interface layer comprises cells having the first pore diameter, and the second portion of the interface layer comprises cells having the second pore diameter, wherein each of the portions of the interface layer has a mixture of the cells having a first pore diameter and the cells having a second pore diameter; and,
   wherein the interface layer has a thickness in the range of from about 15% to about 33% of the total membrane thickness.

2. The membrane of claim 1, wherein the asymmetric layer has an asymmetry ratio of about 2 or more.

3. The membrane of claim 1, comprising a pleated membrane.

4. A method of processing a fluid, comprising passing the fluid into the membrane of claim 1, in the direction from the asymmetric layer toward the isometric layer.

5. The method of claim 4, comprising passing the fluid through the membrane.

6. A method of making the microfiltration membrane according to claim 1, the membrane having an asymmetric layer, an isometric layer, and an interface layer, the interface layer having a first portion contacting the asymmetric layer and a second portion contacting the isometric layer, comprising:
   (a) preparing a first solution comprising a first polymer and a solvent for the first polymer;
   (b) preparing a second solution comprising a second polymer and a solvent for the second polymer;
   (c) casting the first solution onto a first surface of a support;
   (d) after about 2 seconds, casting the second solution on the first solution and forming a pre-membrane;
   (e) exposing the pre-membrane to circulating air; and,
   (f) effecting phase separation of the first solution and the second solution in a nonsolvent liquid.

7. The method of claim 6, wherein at least one solution comprises a polysulfone.

8. The method of claim 6, wherein casting the first solution comprises casting the first solution through first preset gap provided by a first slot die or a first casting knife, and casting the second solution comprises casting the second solution through a second preset gap provided by a second slot die or a second casting knife.

9. A method of making the microfiltration membrane having a first asymmetric layer having a first asymmetric ratio, a second asymmetric layer having a second asymmetry ratio that is greater than the first asymmetry ratio, and an interface layer according to claim 1, the interface layer having a first portion contacting the first asymmetric layer and a second portion contacting the second asymmetric layer, comprising:
   (a) preparing a first solution comprising a first polymer and a solvent for the first polymer;
   (b) preparing a second solution comprising a second polymer and a solvent for the second polymer;
   (c) casting the first solution onto a first surface of a support;
   (d) after about 2 seconds, casting the second solution on the first solution and forming a pre-membrane; and,
   (e) effecting phase separation of the first solution and the second solution in a nonsolvent liquid.

10. The method of claim 9 wherein at least one solution is a polysulfone.

11. A microfiltration membrane comprising
    (a) a first asymmetric polymeric layer, the first asymmetric polymeric layer having a first asymmetry ratio,
    (b) a second asymmetric polymeric layer, the second asymmetric polymeric layer having a second asymmetry ratio, wherein the second asymmetry ratio is greater than the first asymmetry ratio; and
    (c) a polymeric interface layer between the first asymmetric layer and the second asymmetric layer, the interface layer having a first portion contacting the first asymmetric layer and a second portion contacting the second asymmetric layer;
wherein the membrane has a total membrane thickness; and,
(i) the first asymmetric layer has a region contacting the first portion of the interface layer, the region including cells having a first pore diameter;
(ii) the second asymmetric layer has a region contacting the second portion of the interface layer, the region including cells having a second pore diameter;
the first pore diameter being larger than the second pore diameter; and
the first portion of the interface layer comprises cells having the first pore diameter, and the second portion of the interface layer comprises cells having the second pore diameter, wherein each of the portions of the interface layer has a mixture of the cells having a first pore diameter and the cells having a second pore diameter; and,
wherein the first asymmetric layer and the interface layer together have a thickness in the range of from about 8% to about 15% of the total membrane thickness.

12. The microfiltration membrane of claim 11, wherein the first asymmetric polymeric layer has an asymmetry ratio in the range of from about 0.5 to about 1.5.

13. The microfiltration membrane of claim 12, wherein second asymmetric polymeric layer has a asymmetry ratio of about 2 or more.

14. The microfiltration membrane of claim 11, wherein the second asymmetric polymeric layer has an asymmetry ratio of about 2 or more.

15. A method of processing a fluid, comprising passing the fluid into the membrane of claim 11, in the direction from the second asymmetric layer toward the first asymmetric layer.

16. The method of claim 15, comprising passing the fluid through the membrane.

17. The membrane of claim 11, comprising a pleated membrane.

* * * * *